(12) United States Patent  (10) Patent No.: US 8,261,577 B2
Qi  (45) Date of Patent: Sep. 11, 2012

(54) METHOD FOR MAKING HOLLOW MICROSPHERES

(75) Inventor: Gang Qi, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 220 days.

(21) Appl. No.: 12/643,606

(22) Filed: Dec. 21, 2009

(65) Prior Publication Data

US 2011/0152056 A1  Jun. 23, 2011

(51) Int. Cl.
C03B 9/00 (2006.01)
C03B 19/00 (2006.01)
C03B 23/00 (2006.01)
C03B 37/00 (2006.01)
C03C 12/00 (2006.01)
C03C 12/02 (2006.01)
B29B 9/00 (2006.01)

(52) U.S. Cl. .............. 65/21.1; 501/33; 501/34; 65/21.4; 264/5; 264/13

(58) Field of Classification Search ............... 501/33, 501/34; 65/21.1, 21.2, 21.4, 21.5, 142; 264/5, 264/10, 13
See application file for complete search history.

(56) References Cited

U.S. PATENT DOCUMENTS

| 2,978,340 | A |   | 4/1961  | Veatch et al. |
| 3,030,215 | A |   | 4/1962  | Veatch et al. |
| 3,230,064 | A |   | 1/1966  | Veatch et al. |
| 3,365,315 | A |   | 1/1968  | Beck et al. |
| 3,673,101 | A | * | 6/1972  | McKenney et al. ........... 252/639 |
| 4,133,854 | A | * | 1/1979  | Hendricks ....................... 264/10 |
| 4,142,969 | A |   | 3/1979  | Funk et al. |
| 4,163,637 | A |   | 8/1979  | Hendricks |
| 4,257,798 | A |   | 3/1981  | Hendricks et al. |
| 4,279,632 | A |   | 7/1981  | Frosch et al. |
| 4,303,431 | A |   | 12/1981 | Torobin |
| 4,391,646 | A |   | 7/1983  | Howell |
| 4,661,137 | A | * | 4/1987  | Garnier et al. ................. 65/21.4 |
| 4,698,317 | A |   | 10/1987 | Inoue et al. |
| 4,767,726 | A |   | 8/1988  | Marshall |
| 4,960,351 | A | * | 10/1990 | Kendall et al. .................... 425/6 |
| 4,983,550 | A |   | 1/1991  | Goetz et al. |
| 5,002,696 | A |   | 3/1991  | White |
| 5,217,928 | A |   | 6/1993  | Goetz et al. |
| 5,849,055 | A |   | 12/1998 | Arai et al. |
| 2001/0043996 | A1 |  | 11/2001 | Yamada et al. |
| 2005/0284630 | A1 |  | 12/2005 | Nguyen et al. |
| 2006/0243363 | A1 |  | 11/2006 | Hunter et al. |
| 2009/0280328 | A1 |  | 11/2009 | Masuda et al. |

FOREIGN PATENT DOCUMENTS

EP   0 025 309   3/1981

(Continued)

OTHER PUBLICATIONS

International Search Report from International Application No. PCT/US2010/060229, dated Aug. 25, 2011.

*Primary Examiner* — Noah Wiese

(74) *Attorney, Agent, or Firm* — C. Michael Geise

(57) ABSTRACT

There is provided a method for making hollow microspheres including heating a feed under conditions sufficient to convert at least a portion of the feed into hollow microspheres, where the heating is conducted under a vacuum. There is also provided hollow microspheres made using this method.

9 Claims, 4 Drawing Sheets

FOREIGN PATENT DOCUMENTS

| | | |
|---|---|---|
| EP | 0 091 555 | 10/1983 |
| EP | 0 976 447 | 9/2000 |
| JP | 2006-160596 A * | 6/2006 |
| WO | WO 2006/062566 | 6/2006 |
| WO | WO 2007/050062 | 5/2007 |

* cited by examiner

METHOD FOR MAKING HOLLOW MICROSPHERES

The present disclosure relates to a method for making hollow microspheres. The present disclosure also relates to a vacuum apparatus useful for making hollow microspheres.

SUMMARY

In one aspect the present disclosure provides a method of forming hollow microspheres comprising heating a feed under conditions sufficient to convert at least a portion of the feed into hollow microspheres, wherein the heating is conducted under a vacuum.

In another aspect, the present disclosure provides a method of forming hollow microspheres comprising heating a feed under conditions sufficient to convert at least a portion of the feed into hollow microspheres, wherein the heating is conducted under a vacuum, and wherein the vacuum is maintained at equal to or less than 6,773 Pa (2 in Hg) absolute.

In another aspect, the present disclosure provides a method of forming hollow microspheres comprising heating a feed under conditions sufficient to convert at least a portion of the feed into hollow microspheres, and wherein the vacuum is maintained at equal to or less than 33,864 Pa (10 in Hg) absolute.

In another aspect, the present disclosure provides a method of forming hollow microspheres comprising heating a feed under conditions sufficient to convert at least a portion of the feed into hollow microspheres, wherein the feed comprises at least one selected from glass, recycled glass, and perlite.

In another aspect, the present disclosure provides a method of forming hollow microspheres comprising heating a feed under conditions sufficient to convert at least a portion of the feed into hollow microspheres, wherein the feed comprises: (a) between 50 wt % and 90 wt % of $SiO_2$; (b) between 2 wt % and 20 wt % of alkali metal oxides; (c) between 1 wt % and 30 wt % of $B_2O_3$; (d) between 0 wt % to 0.5 wt % of sulfur; (e) between 0 wt % and 25 wt % divalent metal oxides; (f) between 0 wt % and 10 wt % of tetravalent metal oxides other than $SiO_2$; (g) between 0 wt % and 20 wt % of trivalent metal oxides; (h) between 0 wt % and 10 wt % of oxides of pentavalent atoms; and (i) between 0 wt % and 5 wt % fluorine.

In another aspect, the present disclosure provides a method of forming hollow microspheres comprising heating a feed under conditions sufficient to convert at least a portion of the feed into hollow microspheres, and further comprising heating the feed to a temperature greater than or equal to the softening temperature of the feed.

In yet another aspect, the present disclosure provides a hollow microsphere made using a method comprising heating feed under conditions sufficient to convert at least a portion of the feed into hollow microspheres, wherein the heating is conducted under a vacuum.

In another aspect, the present disclosure provides a hollow microsphere made using a method comprising heating feed under conditions sufficient to convert at least a portion of the feed into hollow microspheres, wherein the heating is conducted under a vacuum, wherein the vacuum is maintained at equal to or less than 6,773 Pa (2 in Hg) absolute.

In another aspect, the present disclosure provides a hollow microsphere made using a method comprising heating feed under conditions sufficient to convert at least a portion of the feed into hollow microspheres, wherein the heating is conducted under a vacuum, wherein the vacuum is maintained at equal to or less than 33,864 Pa (10 in Hg) absolute.

In another aspect, the present disclosure provides a hollow microsphere made using a method comprising heating feed under conditions sufficient to convert at least a portion of the feed into hollow microspheres, wherein the heating is conducted under a vacuum, where in the feed comprises at least one selected from glass, recycled glass, and perlite.

In another aspect, the present disclosure provides a hollow microsphere made using a method comprising heating feed under conditions sufficient to convert at least a portion of the feed into hollow microspheres, wherein the heating is conducted under a vacuum, wherein the feed comprises (a) between 50 wt % and 90 wt % of $SiO_2$; (b) between 2 wt % and 20 wt % of alkali metal oxides; (c) between 1 wt % and 30 wt % of $B_2O_3$; (d) between 0 wt % to 0.5 wt % of sulfur; (e) between 0 wt % and 25 wt % divalent metal oxides; (f) between 0 wt % and 10 wt % of tetravalent metal oxides other than $SiO_2$; (g) between 0 wt % and 20 wt % of trivalent metal oxides; (h) between 0 wt % and 10 wt % of oxides of pentavalent atoms; and (i) between 0 wt % and 5 wt % fluorine.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
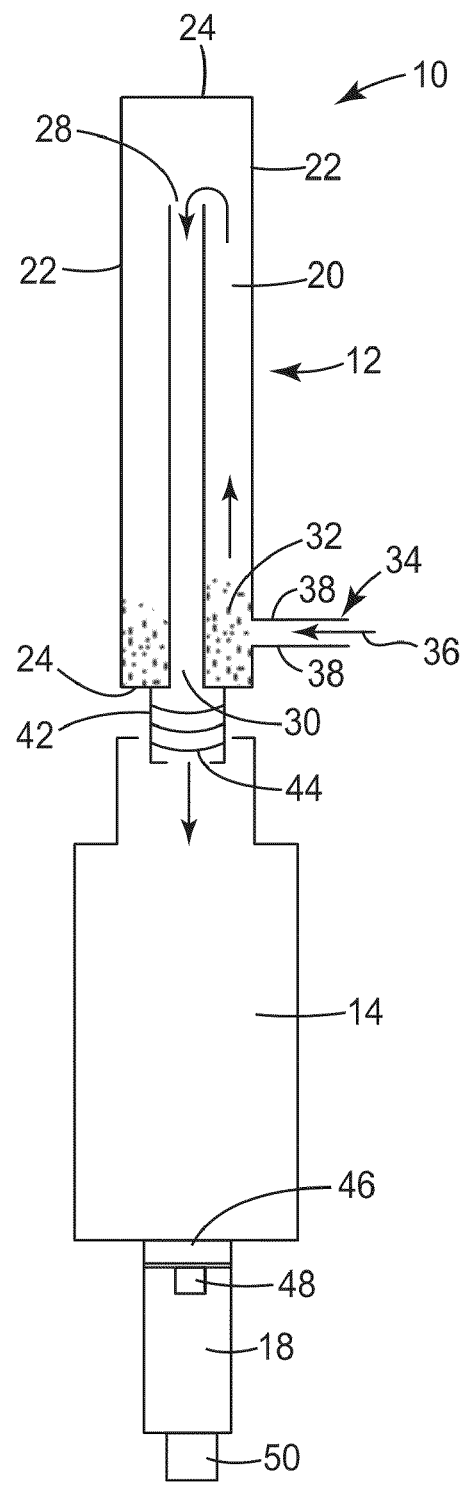
FIG. 1 is a front cross sectional view of one embodiment of the presently disclosed apparatus used to make hollow microspheres.

The term "glass" as used herein includes all amorphous solids or melts that can be used to form amorphous solids, where the raw materials used to form such glass includes various oxides and minerals. These oxides include metal oxides.

The term "recycled glass" as used herein means any materials formed using glass as the raw material.

The term "vacuum" as used herein means absolute pressure below 101,592 Pa (30 in Hg).

Hollow microspheres, having a mean diameter of less than about 500 micrometers, have wide utility for many purposes, several of which require certain size, shape, density and strength characteristics. For example, hollow microspheres are widely used in industry as additives to polymeric compounds where they may serve as modifiers, enhancers, rigidifiers, and/or fillers. Generally, it is desirable that the hollow microspheres be strong to avoid being crushed or broken during further processing of the polymeric compound, such as by high pressure spraying, kneading, extrusion or injection molding. It is desirable to provide a method for making hollow microspheres that allows for control over the size, shape, density and strength of the resulting hollow microspheres.

Hollow microspheres and methods for making them have been disclosed in various references. For example, some of these references disclose a process of making hollow microspheres using simultaneous fusion of glass-forming components and expansion of the fused mass. Other references disclose heating a glass composition containing an inorganic gas forming agent, or blowing agent, and heating the glass to a temperature sufficient to liberate the blowing agent. Still other references disclose a process including pulverizing a material by wet pulverization to obtain a slurry of a pulverized powder material, spraying the slurry to form liquid droplets, and heating the liquid droplets to fuse or sinter the powder material in order to obtain inorganic microspheres. Yet other references disclose a process for making low density microspheres by processing precisely formulated feed mixtures in an entrained flow reactor under partially oxidizing conditions with a carefully controlled time-temperature history. However, none of these references provide a method for making hollow microspheres that provides control over the size, shape, density and strength of the hollow microspheres made therefrom.

In addition to size, density and strength, the utility of hollow microspheres may be dependent upon water-sensitivity and cost, which means that it is preferable that glass compositions used to make hollow microspheres include relatively high silica content. However, higher silica content in the glass composition is not always desirable because in the initial glass preparation, the higher temperatures and longer melt times required for higher silica glasses reduce the amount of blowing agent that can be retained, which prevents the formation of low density glass bubbles. To obtain hollow microspheres having a low density (e.g., less than 0.2 gram per cc) it is difficult to retain enough blowing agent during the initial glass melting operation. It is desirable to use glass compositions having relatively high silica content while still creating low density bubbles.

Hollow microspheres are typically made by heating milled frit, commonly referred to as "feed" that contains a blowing agent. Known methods for making hollow microspheres includes glass melting, glass feed milling, and hollow microsphere formation using a flame. The key to this process is that the glass composition used to form the hollow microsphere must include a certain amount of a blowing agent prior to formation of the hollow microsphere using a flame. The blowing agent is generally a composition that decomposes at high temperatures. Exemplary blowing agents include sulfur or compounds of sulfur and oxygen, which may be present in the glass composition in an amount greater than about 0.12 wt % blowing agent based on the total weight of the glass composition.

In these methods, it is necessary to melt the glass twice, once during batch melting to dissolve the blowing agent in the glass and another time during formation of the hollow microsphere. Because of the volatility of the blowing agent in the glass composition, the batch melting step is limited to relatively low temperatures during which the batch composition becomes very corrosive to the refractory of melting tanks used for the batch melting step. The batch melting step also requires a relatively long time and the sizes of the glass particles used in the batch melting step must be kept small. These issues result in increased cost to and potential impurities in the resulting hollow microspheres. It is desirable to provide a method for making hollow microspheres that does not require the use of a blowing agent.

Feed useful in the present disclosure may be prepared, for example, by crushing and/or milling any suitable glass. The feed in the present disclosure may have any composition that is capable of forming a glass, such as recycled glass, perlite, silicate glass, and the like. In some embodiments, on a total weight basis, the feed comprises from 50 to 90 percent of $SiO_2$, from 2 to 20 percent of alkali metal oxide, from 1 to 30 percent of $B_2O_3$, from 0 to 0.5 percent of sulfur (for example, as elemental sulfur), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$, from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. In one embodiment, the feed comprises 485 g of $SiO_2$ (obtained from US Silica, West Virginia, USA), 114 g of $Na_2O.2B_2O_3$, 90% smaller than 590 μm, 161 g of $CaCO_3$, 90% smaller than 44 μm, 29 g of $Na_2CO_3$, 3.49 g of $Na_2SO_4$, 60% smaller than 74 μm, and 10 g of $Na_4P_2O_7$, 90% smaller than 840 μm. In another embodiment the feed comprises 68.02% of $SiO_2$, 7.44% of $Na_2O$, 11.09% $B_2O_3$, 12.7% of $CaCO_3$ and 0.76% of $P_2O_5$.

Additional ingredients are useful in feed compositions and can be included in the feed, for example, to contribute particular properties or characteristics (for example, hardness or color) to the resultant hollow microspheres. In some embodiments, the above mentioned feed compositions are essentially free of blowing agent. The phrase "essentially free of blowing agent" as used herein means less than 0.12 wt % of blowing agent based on the total weight of the feed composition. In one embodiment, the feed comprises less than or equal to about 0.12 wt % sulfur based on the total weight of the feed composition. In another embodiment, the feed comprises about 0 wt % sulfur based on the total weight of the feed composition.

The feed is typically milled, and optionally classified, to produce feed of suitable particle size for forming hollow microspheres of the desired size. Methods that are suitable for milling the feed include, for example, milling using a bead or ball mill, attritor mill, roll mill, disc mill, jet mill, or combination thereof. For example, to prepare feed of suitable particle size for forming hollow microspheres, the feed may be coarsely milled (for example, crushed) using a disc mill, and subsequently finely milled using a jet mill. Jet mills are generally of three types: spiral jet mills, fluidized-bed jet mills, and opposed jet mills, although other types may also be used.

Spiral jet mills include, for example, those available under the trade designations "MICRONIZER JET MILL" from Sturtevant, Inc., Hanover, Mass.; "MICRON-MASTER JET PULVERIZER" from The Jet Pulverizer Co., Moorestown, N.J.; and "MICRO-JET" from Fluid Energy Processing and Equipment Co., Plumsteadville, Pa. In a spiral jet mill a flat cylindrical grinding chamber is surrounded by a nozzle ring. The material to be ground is introduced as particles inside the nozzle ring by an injector. The jets of compressed fluid expand through the nozzles and accelerate the particles, causing size reduction by mutual impact.

Fluidized-bed jet mills are available, for example, under the trade designations "CGS FLUIDIZED BED JET MILL" from Netzsch Inc., Exton, Pa.; "ROTO-JET" from Fluid Energy Processing and Equipment Co.; and "ALPINE MODEL 100 APG" from Hosokawa Micron Powder Systems, Summit, N.J. The lower section of this type of machines is the grinding zone. A ring of grinding nozzles within the grinding zone is focused toward a central point, and the grinding fluid accelerates particles of the material being milled. Size reduction takes place within the fluidized bed of material, and this technique can greatly improve energy efficiency.

Opposed jet mills are similar to fluidized-bed jet mills, except at least two opposed nozzles accelerate particles, causing them to collide at a central point. Opposed jet mills may be commercially obtained, for example, from CCE Technologies, Cottage Grove, Minn.

Figure 2:
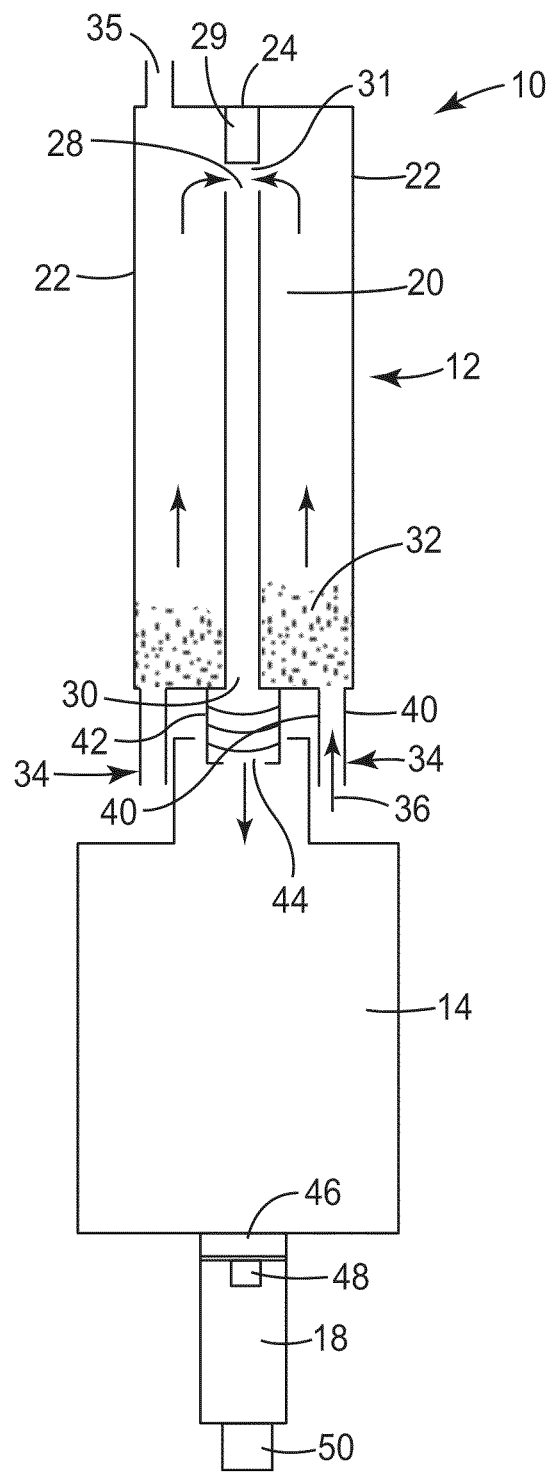
FIG. 2 is a front cross sectional view of one embodiment of the presently disclosed apparatus used to make hollow microspheres.

Once the feed has been milled, it is fed into the presently disclosed apparatus, which includes a dispensing system, a heating system, a vacuum system and a collector. Referring now to FIGS. 1 and 2, there are shown two exemplary embodiments of the disclosed apparatus 10.

Apparatus 10 shown in FIGS. 1 and 2 includes a dispensing system 12 having an elongated housing 20. Elongated housing 20 has vertical walls 22 that are longer than horizontal walls 24. The size and shape of elongated housing 20 is selected depending on the type and volume of feed to be dispensed there through. For example, elongated housing 20 may be spherically shaped. Exemplary elongated housing 20 shown in FIG. 1 is spherical and has a diameter of about 3.81 cm. Exemplary elongated housing 20 shown in FIG. 2 is spherical and has a diameter of about 5.08 cm. Elongated housing 20 may be made of any material suitable for dispensing feed 32, for example materials such as metal, glass, resins, and the like, and combinations thereof. For example, elongated housing 20 shown in FIG. 1 is constructed entirely of glass and elongated housing 20 shown in FIG. 2 includes glass vertical walls 22 and metal horizontal walls 24.

Elongated housing 20 also includes a hollow inner tube 26 that is vertically centered within elongated housing 20. The size and shape of hollow inner tube 26 is selected depending on the type and volume of feed 32 to be dispensed there through. For example, hollow inner tube 26 may be spherically shaped. Exemplary hollow inner tube 26 shown in FIG. 1 is spherical and has a diameter of about 1.27 cm. Exemplary hollow inner tube 26 shown in FIG. 2 is spherical and has a diameter of about 2.54 cm. Hollow inner tube 26 is open at a top end 28 and a bottom end 30, such that particles or feed 32 may pass there through. As shown in FIG. 2, elongated housing 20 may also include a vertically extending protrusion 29 that extends from the top of elongated housing 20 to just above top end 28 of hollow inner tube 26 in order to provide a gap 31 between vertically extending protrusion 29 and top end 28 of hollow inner tube 26. Hollow inner tube 26 may be made of any material suitable for dispensing feed 32, for example materials such as metal, glass, resins, and the like, and combinations thereof. For example, hollow inner tube 26 shown in FIG. 1 is constructed entirely of glass and hollow inner tube 26 shown in FIG. 2 is constructed entirely of metal.

Elongated housing 20 also includes a neck 34. Neck 34 defines an inlet for receiving a feed 32 in FIG. 1 and carrier gas used to fluidize and move feed 32 into the hollow inner tube in apparatus 10. Neck 34 may be positioned near the bottom of vertical wall 22 of dispensing system 12 or horizontal wall 24 of dispensing system 12. For example, neck 34 shown in FIG. 1 is positioned along a portion of vertical wall 22 that is closest to heating system 14 and includes an opening 36 and horizontally extending walls 38. Exemplary neck 34 shown in FIG. 2 is positioned along a portion of horizontal wall 24 and includes an opening 36 and vertically extending walls 40. Dispensing system 12 shown in FIG. 2 has two necks 34 or may have more along a portion of the bottom horizontal wall 24. Exemplary necks 34 shown in FIG. 2 are small like orifice. An inlet 35 for receiving feed 32 shown in FIG. 2 is located in the top horizontal wall 24.

Bottom end 30 of hollow inner tube 26 is operably attached to an inlet 44 to heating system 14. Apparatus 10 may include a transition 42 between bottom end 30 of hollow inner tube 26 and inlet 44 to heating system 14. It is desirable for transition 42 between bottom end 30 of hollow inner tube 26 and inlet 44 to heating system 14 to be sealed to avoid the introduction of ambient air into apparatus 10. For example, transition 42 between bottom end 30 of hollow inner tube 26 and inlet 44 to heating system 14 may be sealed with an o-ring or any other type of conventional gasket material to prevent ambient air from entering apparatus 10 during operation.

Apparatus 10 includes a heating system 14. Any commercially available heating systems may be used, such as for example, a furnace model "Astro 1100-4080 MI" commercially available from Thermal Technology Inc., California, USA. One skilled in the art can appreciate that the temperature within heating system 14 depends on various factors, such as, for example, the type of material used in feed 32. In the presently disclosed method, the temperature within the heating system 14 should be maintained at a temperature greater than or equal to the glass softening temperature. In embodiment, the temperature within heating system 14 is maintained at greater than about 1300° C. Exemplary temperatures include temperatures above about 1300° C., above about 1410° C., above about 1550° C., above about 1560° C., above about 1575° C., above about 1600° C. and above about 1650° C.

Apparatus 10 also include a vacuum system 16 (not shown) that provides a vacuum within heating system 14. Any commercially available vacuum systems may be used. Vacuum system 16 may be a stand alone system that is connected to heating system 14 via plumbing lines, such as air lines, liquid lines, and the like. Vacuum system 16 may also be integrated into heating system 14, collector 18, or both. For example, cool air blowers commercially available under the trade designation "Master Heat Gun" from Master Appliances Corp. Wisconsin, USA, may be incorporated directly into heating system 14. These cool air blowers may provide cooling air at the inlet to heating system 14, outlet to heating system 14, inlet to collector 18, or a combination thereof. It is desirable to maintain an internal pressure in the presently disclosed heating system 14 of about less than 6,773 Pa (2 in Hg) absolute. Among other benefits, maintaining an internal pressure in heating system 14 of about less than 6,773 Pa (2 in Hg) absolute is useful in the presently disclosed method of making hollow microspheres when using feed 32 that are essentially free of blowing agent.

Apparatus 10 may also include a collector 18 in which formed hollow microspheres are collected. An inlet 48 of collector 18 is operably attached to outlet 46 of heating system 14. It is desirable for the connection between collector 18 and heating system 14 to be sealed to avoid the introduction of ambient air into apparatus 10. For example, the connection between collector 18 and heating system 14 may be sealed with an o-ring or any other type of conventional gasket material to prevent ambient air from entering apparatus during operation. One skilled in the art can appreciate that collector 18 can be designed numerous ways depending on various factors, such as the size, shape and volume of hollow microspheres being collected therein, integration of vacuum system 14 therein, operation temperature for apparatus 10, and the like.

Still referring to FIGS. 1 and 2, during the presently disclosed method for making hollow microspheres, particles or feed 32 are fed into apparatus 10 using a carrier gas, where the carrier gas can be any inert gas. One skilled in the art can appreciate that the flow rate of carrier gas is selected based on various factors, such as, for example, the size, shape and volume of feed being fed into apparatus 10, the desired pressure within apparatus 10, and the like. The flow rate of carrier gas should be sufficient to introduce feed 32 into an opening at top end 28 of hollow inner tube 26. Feed 32 are then pulled toward heating system 14 because of the vacuum created within heating system 14 by vacuum system 16. Once in heating system 14, feed 32 become hollow microspheres. In one embodiment, the hollow microspheres are allowed to free fall via gravity through heating system 14 and exit outlet 46 in heating system 14. In another embodiment, the hollow microspheres may be pulled through outlet 46 in heating system 14 and into collector 18 via a higher vacuum in collector 18 than the vacuum maintained in heating system 14. Hollow microspheres collected in collector 18 may be dispensed from apparatus 10 through outlet 50 in collector 18. Alternately, collector 18 may be removable from apparatus 10 in order to discharge formed hollow microspheres from apparatus 10.

Hollow microspheres made using the presently disclosed method have relatively low densities. In some embodiments, the presently disclosed hollow microspheres have a density of less than about 1.3 g/ml. In some embodiments, the presently disclosed hollow microspheres have a density of less than about 0.8 g/ml. In still other embodiments, the presently disclosed hollow microspheres have a density of less than about 0.5 g/ml, less than about 0.4 g/ml, less than about 0.3 g/ml, or less than about 0.2 g/ml.

Hollow microspheres made using the presently disclosed method have relatively high strengths. In some embodiments, the presently disclosed hollow microspheres have a strength of greater than about 350 psi. In some embodiments, the presently disclosed hollow microspheres have a strength of greater than about 1500 psi. In still other embodiments, the presently disclosed hollow microspheres have a strength of greater than about 2500 psi, greater than about 5000 psi, greater than about 10,000 psi, or greater than about 15,000 psi.

Hollow microspheres made using the presently disclosed method have substantially single cell structures. The term "substantially" as used herein means that the majority of the hollow microspheres made using the presently disclosed method have single cell structures. The term "single cell structure" as used herein means that each hollow microsphere is defined by only one outer wall with no additional exterior walls, partial spheres, concentric spheres, or the like present in each individual hollow microsphere. Exemplary single cell structures are shown in the optical images shown in FIGS. 3 and 4.

The following specific, but non-limiting, examples will serve to illustrate the invention. In these examples, all amounts are expressed in parts by weight unless specified otherwise.

Apparatus

A furnace model "Astro 1100-4080 MI" (commercialized by Thermal Technology Inc., California, USA) was used as the heating system in the following examples, except that the inner chamber (inplate) was modified by removing the upper and lower heaths to allow particles or feed to free fall through the heating system. Three cooling air blowers (commercialized by Master Appliances Corp., Wisconsin, USA, under the trade designation "Master Heat Gun") were fixed to the structure of the heating system by means of mechanical clamps: one cooling air blower was located in the top portion of the heating system near a feeding opening, and two cooling air blowers were located in the bottom portion of the heating system, blowing air at a collecting opening. A feeding opening located on the top portion of the heating system was modified by adding an o-ring seal to hold dispensing systems in place.

Test Methods

Average Particle Density Determination

A fully automated gas displacement pycnometer obtained under the trade designation "Accupyc 1330 Pycnometer" from Micromeritics, Norcross, Ga., was used to determine the density of microspheres according to ASTM D2840-69, "Average True Particle Density of Hollow Microspheres".

Floated density is measured from the sample which goes through the water floating step to remove any heavy microspheres, or "sinkers".

Particle Size Determination

Particle size distribution was determined using a particle size analyzer available under the trade designation "Coulter Counter LS-130" from Beckman Coulter, Fullerton, Calif.

Strength Test

The strength of the hollow microspheres was measured using ASTM D3102-72; "Hydrostatic Collapse Strength of Hollow Glass Microspheres" with the exception that the sample size of hollow microspheres is 10 mL, the hollow microspheres are dispersed in glycerol (20.6 g) and data reduction was automated using computer software. The value reported is the hydrostatic pressure at which 10 percent by volume of the raw product collapses.

EXAMPLES

Examples 1-4

Recycled glass particles (available from Strategic Materials Inc., of Texas, USA) were milled in a fluidized bed jet mill (available under the trade designation "Alpine Model 100 APG" from Hosokawa Micron Powder Systems, Summit, N.J.) yielding a feed with average particle size of about 20 µm. The feed was dispensed into the heating system using the apparatus depicted in FIG. 2 and described in the corresponding text. With the feed placed between the elongated housing and the hollow inner tube, carrier gas was injected through the neck at a flow rate of 4 cubic feet per hour (CFH) and absolute pressure of 6,773 Pa (2 in Hg) absolute. The feed was suspended toward the constricted opening at the top end the hollow inner tube and pulled toward the heating system through the hollow tube due to the vacuum pressure applied thereto.

Raw materials and process conditions are listed in Table 1.

Figure 3:
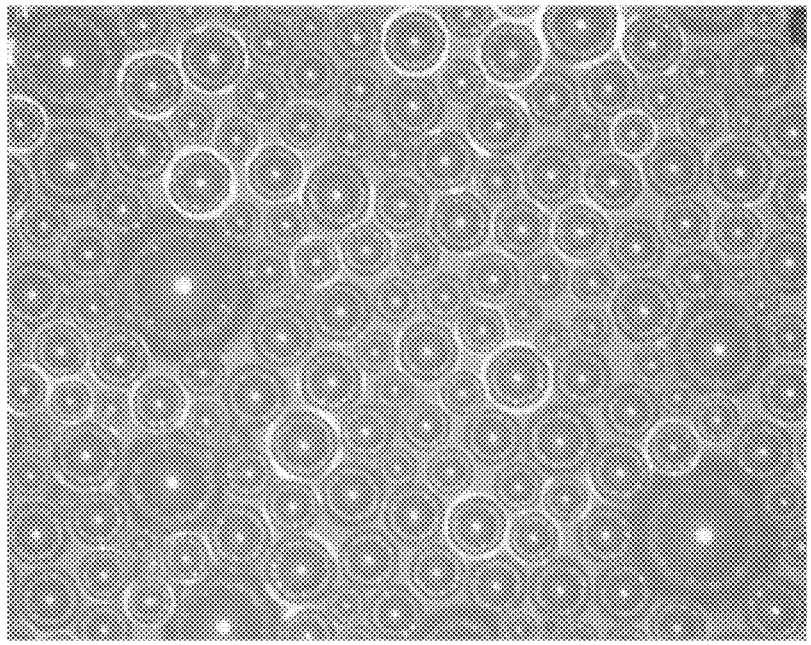
FIG. 3 is an optical image of recycled glass hollow microspheres prepared according to Example 1.

FIG. 3 is the optical image of the recycled glass hollow microspheres prepared as described in Example 1 taken with a microscope model "DM LM" connected to a digital camera model HRD-060HMT, available from Leica Mycrosystems of Illinois, USA. The hollow microspheres shown in FIG. 3 have a substantially single cell structure.

After formation of the hollow microspheres, density and strength were measured. The results are also shown in Table 1. For Example 1, floated density was measured.

TABLE 1

| Example | Recycled Glass | Trade designation | Temperature (° C.) | Density (g/ml) | Strength 90% (psi) |
|---|---|---|---|---|---|
| Example 1 | White | Flint | 1575 | 0.2386 | 2800 |
| Example 2 | White | Flint | 1600 | 0.3328 | 1692 |
| Example 3 | Green | Emerald Green | 1650 | 0.8095 | 3769 |
| Example 4 | Brown | Amber | 1650 | 0.7539 | >15000 |

Examples 5 and 6

Examples 5 and 6 were prepared using a feed obtained as described in PCT Patent Application WO2006062566, incorporated herein by reference. The feed comprised 485 g of $SiO_2$ (obtained from US Silica, West Virginia, USA), 114 g of $Na_2O.2B_2O_3$, 90% smaller than 590 μm (obtained from US Borax, California, USA), 161 g of $CaCO_3$, 90% smaller than 44 μm (obtained from Imerys, Alabama, USA), 29 g of $Na_2CO_3$ (obtained from FMC Corp., Wyoming, USA), 3.49 g of $Na_2SO_4$, 60% smaller than 74 μm (obtained from Searles Valley Mineral, California, USA), and 10 g of $Na_4P_2O_7$, 90% smaller than 840 μm (obtained from Astaris, Missouri, USA). Total sulfur concentration of the glass feed was 0.12%.

Figure 4:
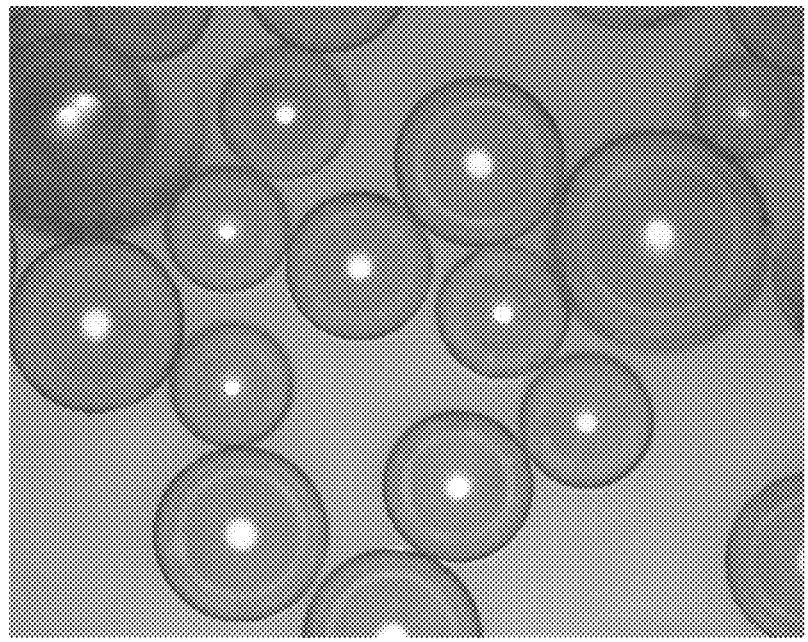
FIG. 4 is an optical image of the glass hollow microspheres prepared according to Example 5.

The feed was milled in the fluidized bed jet mill described in Examples 1-4, yielding a feed with average particle size of about 13 μm. The feed was dispensed into the heating system as described in Examples 1-4 and using the apparatus depicted in FIG. 2 and described in the corresponding text. FIG. 4 is the optical image of glass microspheres prepared as described in Example 5.

Temperature was measured using a handheld pyrometer (available under the trade designation Mikraon M90-31 from Mikron Infrared, California, USA).

Process conditions and test results are shown in Table 2, below.

TABLE 2

| Example | Temperature (° C.) | Density (g/ml) | Strength (psi) | Bubble size (mesh) |
|---|---|---|---|---|
| Example 5 | 1300 | 0.40 | >5000 | 200 |
| Example 6 | 1560 | 0.15 | 380 | Not measured |

Example 7

A feed was prepared as described in Example 5, except that no sodium sulfate was used. The composition of the feed based on total weight was: 68.02% of $SiO_2$, 7.44% of $Na_2O$, 11.09% $B_2O_3$, 12.7% of $CaCO_3$ and 0.76% of $P_2O_5$. The feed was produced by milling the feed in the fluid bed jet mill until the average particle size was of approximately 20 μm. Hollow microspheres prepared as described in Example 7 had 0 wt % sulfur concentration.

The feed was dispensed into the heating system using the apparatus depicted in FIG. 1 and described in the corresponding text. With the feed placed inside the elongated housing, carrier gas was injected through the neck at a flow rate of 4 cubic feet per hour (CFH) and absolute pressure of 6,773 Pa (2 in Hg) absolute. The feed was suspended toward the top end of the hollow inner tube and pulled toward the heating system through the hollow tube due to the vacuum pressure applied thereto. Process conditions and test results are shown in Table 3, below.

TABLE 3

| Example | Temperature (° C.) | Vacuum (Pa) absolute | Density (g/ml) | Strength (psi) |
|---|---|---|---|---|
| Example 7 | 1550 | 6,773 (2 inHg) | 0.73 | >10,000 |

Example 8

Particles of perlite (available from Redco II, California, USA) were milled using the fluidized bed jet mill described in Examples 1-4 until average particle size was about 25 μm. The milled particles were classified using 400-mesh and 200-mesh stainless steel screens (available from (McMaster-Carr, of Illinois, USA). Particles with average particle size between 200 and 400 mesh were mixed with fumes silica (available under the trade designation Cab-O-Sil TS-530" from Cabot Corporation, Massachusetts, USA) on a 1% by weight ratio. The perlite and fumed silica particles were dispensed into the heating system using the apparatus depicted in FIG. 2 and described in the corresponding text, except that a absolute pressure 33,864 Pa (10 in Hg) was used.

Figure 5:
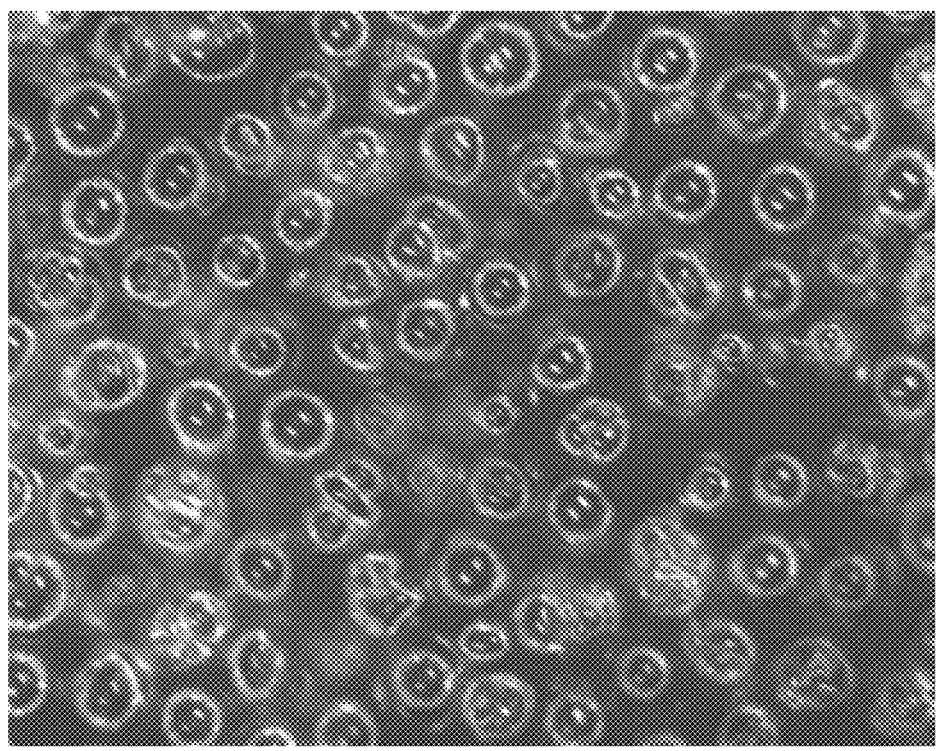
FIG. 5 is optical image of the perlite hollow microspheres prepared as described in Example 8.

FIG. 5 is the optical image of perlite hollow microspheres prepared as described in Example 8. Process conditions and test results are shown in Table 4, below.

TABLE 4

| Example | Temperature (° C.) | Vacuum (Pa absolute) | Density (g/ml) |
|---|---|---|---|
| Example 8 | 1410 | 33,864 (10 inHg) | 1.26 |

Comparative Example A

Comparative Example A includes hollow microspheres commercially available from 3M Company under the trade designation "3M Glass Bubbles K1", which are made using a flame forming process. Total sulfur content in the feed before the flame forming process was 0.47 wt % sulfur based on the total weight of the feed. Properties of the hollow microspheres are shown in Table 5, below. Particle size distribution for the hollow microspheres is shown in Table 6, below.

TABLE 5

| Example | Density (g/ml) | Strength (psi) |
|---|---|---|
| Comp. Example A | 0.125 | 250 |

TABLE 6

| Percentage of particles (%) | Size (μm) |
|---|---|
| 10 | 30.0 |
| 50 | 65.0 |
| 50 | 115.0 |

Various modifications and alterations of this invention will become apparent to those skilled in the art without departing from the scope and spirit of this invention.

What is claimed is:

1. A method of forming hollow microspheres comprising heating a feed under conditions sufficient to convert at least a portion of the feed into hollow microspheres, wherein the heating is conducted under a vacuum; further comprising providing the feed using a dispensing system, the dispensing system comprising an elongated housing having a hollow inner tube vertically centered therein; fluidizing the feed in the elongated housing; and introducing the feed into the hollow inner tube using a carrier gas.

2. A method according to claim 1 wherein the hollow inner tube has a top end and a bottom end, wherein the top end and bottom end are completely open.

3. A method according to claim 1 wherein the hollow inner tube has a top end and a bottom end, and further wherein a vertically extending protrusion extends from the top of the elongated housing to just above the top end of the hollow inner tube.

4. A method according to claim 1 further comprising collecting formed hollow microspheres in a collector.

5. A method according to claim 1 wherein the vacuum is maintained at equal to or less than 6,773 Pa (2 in Hg) absolute.

6. A method according to claim 1 wherein the vacuum is maintained at equal to or less than 33,864 Pa (10 in Hg) absolute.

7. A method according to claim 1 wherein the feed comprises at least one selected from glass, recycled glass, and perlite.

8. A method according to claim 1 wherein the feed comprises
   (a) between 50 wt % and 90 wt % of $SiO_2$;
   (b) between 2 wt % and 20 wt % of alkali metal oxides;
   (c) between 1 wt % and 30 wt % of $B_2O_3$;
   (d) between 0 wt % to 0.5 wt % of sulfur;
   (e) between 0 wt % and 25 wt % divalent metal oxides;
   (f) between 0 wt % and 10 wt % of tetravalent metal oxides other than $SiO_2$;
   (g) between 0 wt % and 20 wt % of trivalent metal oxides;
   (h) between 0 wt % and 10 wt % of oxides of pentavalent atoms; and
   (i) between 0 wt % and 5 wt % fluorine.

9. A method according to claim 1 further comprising heating the feed to a temperature greater than or equal to the softening temperature of the feed.

* * * * *